US010003604B2

(12) United States Patent
Fahrny et al.

(10) Patent No.: US 10,003,604 B2
(45) Date of Patent: *Jun. 19, 2018

(54) AUTHENTICATED COMMUNICATION BETWEEN SECURITY DEVICES

(71) Applicant: Comcast Cable Communications, LLC, Philadelphia, PA (US)

(72) Inventors: James Fahrny, Parker, CO (US); Nancy Davoust, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/008,060

(22) Filed: Jan. 27, 2016

(65) Prior Publication Data
US 2016/0323294 A1 Nov. 3, 2016

Related U.S. Application Data

(63) Continuation of application No. 12/389,718, filed on Feb. 20, 2009, now Pat. No. 9,282,106.

(51) Int. Cl.
*H04L 29/06* (2006.01)
*G06F 21/10* (2013.01)
(Continued)

(52) U.S. Cl.
CPC ............ *H04L 63/126* (2013.01); *G06F 21/10* (2013.01); *H04L 9/321* (2013.01); *H04L 63/105* (2013.01);
(Continued)

(58) Field of Classification Search
None
See application file for complete search history.

(56) References Cited

U.S. PATENT DOCUMENTS 6,484,257 B1 11/2002 Ellis
6,904,150 B1 6/2005 Dent
(Continued)

OTHER PUBLICATIONS

Lauter et al. NPL Pub 2006—Security Analysis of KEA Authenticated Key Exchange Protocol.
(Continued)

*Primary Examiner* — Tri Tran
(74) *Attorney, Agent, or Firm* — Banner & Witcoff, Ltd.

(57) ABSTRACT

Apparatuses, computer readable media, and methods establishing and maintaining trust between security devices for distributing media content are provided. Two security devices bind to establish an initial trust so that security information can be exchanged. Subsequently, trust is refreshed to verify the source of a message is valid. In an embodiment, the security devices may comprise a security processor and a system on a chip (SoC) in a downloadable conditional access system. Trust may be refreshed by a security device inserting authentication information in a message to another security device, where authentication information may assume different forms, including a digital signature (asymmetric key) or a hash message authentication code (HMAC). Trust may also be refreshed by extracting header information from the message, determining state information from at least one parameter contained in the header information, and acting on message content only when the state information is valid.

23 Claims, 8 Drawing Sheets

(51) Int. Cl.
      H04N 7/167      (2011.01)
      H04N 21/4367    (2011.01)
      H04N 21/443     (2011.01)
      H04N 21/81      (2011.01)
      H04L 9/32       (2006.01)
      H04N 21/254     (2011.01)
      H04N 21/4627    (2011.01)

(52) U.S. Cl.
      CPC ....... *H04N 7/1675* (2013.01); *H04N 21/2541* (2013.01); *H04N 21/4367* (2013.01); *H04N 21/443* (2013.01); *H04N 21/4627* (2013.01); *H04N 21/8166* (2013.01); *H04N 21/8193* (2013.01); *H04L 2463/101* (2013.01)

(56) References Cited

U.S. PATENT DOCUMENTS

| | | | |
|---|---|---|---|
| 7,117,365 | B1 | 10/2006 | Rump et al. |
| 7,461,249 | B1* | 12/2008 | Pearson ............ G06F 21/10 705/59 |
| 7,685,422 | B2 | 3/2010 | Isozaki et al. |
| 2003/0028773 | A1* | 2/2003 | McGarvey ............ H04L 9/3213 713/176 |
| 2003/0033523 | A1 | 2/2003 | McNulty et al. |
| 2003/0065917 | A1* | 4/2003 | Medvinsky ............ G06F 21/10 713/160 |
| 2003/0093694 | A1 | 5/2003 | Medvinsky et al. |
| 2003/0188164 | A1 | 10/2003 | Okimoto et al. |
| 2004/0010684 | A1 | 1/2004 | Douglas |
| 2004/0068655 | A1 | 4/2004 | Nishimura et al. |
| 2006/0010074 | A1 | 1/2006 | Zeitsiff et al. |
| 2006/0272022 | A1 | 11/2006 | Loukianov et al. |
| 2007/0283149 | A1 | 12/2007 | Devarapalli |
| 2008/0189500 | A1 | 8/2008 | Jennings et al. |
| 2008/0313463 | A1 | 12/2008 | Depietro et al. |
| 2009/0135723 | A1* | 5/2009 | Davidson ............ H04L 43/0852 370/241 |
| 2009/0249492 | A1 | 10/2009 | Boesgaard Sorensen |

OTHER PUBLICATIONS

"The Keyed-Hash Message Authentication Code (HMAC)", Federal Information Processing Standards Publication 198, FIPS PUB 198, Mar. 6, 2002, 20 pages.

European Search Report for related Application No. EP 10 15 1361, dated Apr. 28, 2010, pp. 1-2.

Menezes A.J. et al., "Hash Functions and Data Integrity," Handbook of Applied Cryptography, Passage, Jan. 1, 1997, pp. 352-368, CRC Press, Boca Raton, FL.

Menezes A.J. et al., "Challenge-response identification (strong authentication)," Handbook Applied Crytography, Passage, Jan. 1, 1997, pp. 397-405, 548, CRC Press, Boca Raton, FL.

Voluntary Amendments filed in Related Canadian Case—CA 2,692,326.

CA Office Action—CA Application 2,692,326—dated Apr. 11, 2016.

* cited by examiner

AUTHENTICATED COMMUNICATION BETWEEN SECURITY DEVICES

CROSS-REFERENCES TO RELATED APPLICATIONS

The present application is a continuation of U.S. patent application Ser. No. 12/389,718, filed Feb. 20, 2009, the contents of which are hereby incorporated by reference in their entirety.

TECHNICAL FIELD

Aspects of the invention relate to providing secure delivery of specialized keys and entitlement or license files for decrypting content and program streams in home network applications. More specifically, aspects of the invention relate refreshing trust between different security devices.

BACKGROUND

A Downloadable Conditional Access System (DCAS) provides secure software download of a specific Conditional Access client (computer program) which controls Digital Rights Management (DRM) into an OpenCable Application Platform (OCAP)-compliant host consumer media device. One objective of DCAS is to remove the need for security to be embedded into physical set-top boxes or CableCARDs required to protect encrypted digital content. It is proposed that instead of a card with removable circuitry, a custom ASIC chip be soldered onto the circuit board of any digital cable-ready device. DCAS software would run on this custom chip. Additional circuitry needed to run the OCAP operating system may be required. OCAP applications or other set-top software then may be used as the sole method of interacting with DCAS since it will enable cable companies to download new security software.

One purpose of DCAS is to implement hardware based bridging from Conditional Access to DRM protection in either hardware or software, supported by future OCAP-compliant consumer devices such as digital televisions, DVRs, and set-top boxes (that may be required to support legacy non-OCAP-compliant devices). This secures the information transmitted in the link between the cable company and the consumer device. Besides decryption and possible re-encryption to a DRM, the DCAS software may also control how the content is used, e.g., whether it must be deleted immediately after viewing or after a set period of time, what devices it may be transferred to, and whether transfer or recording is permitted.

Modern network environments generally have a network device at an end user's location to allow proper reception and transmission of information. For example, in cable communications network environments, end users general utilize a set top box or modem to receive and transmit information from a cable providers network. Typically, the data transmitted from the cable provider's network to an end user comprises audio, video, and audio visual content. Such content may be delivered using various security mechanisms. These security mechanisms attempt to ensure that only authorized users utilize the delivered content.

Traditional systems provide security for delivered content; however, these systems are often prone to hacker attack. Thus, systems and methods that provide for greater protection of security information would be beneficial to the art.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

With an aspect of the invention, two security devices at customer premise establish and maintain trust so that media content can be distributed to the customer. The two security devices bind to establish an initial trust so that security information can be exchanged. Subsequently, trust is refreshed to verify that the source of a message is valid. In an embodiment, the security devices may comprise a hardware security element (HSE) and a system on a chip (SoC) in a downloadable conditional access system.

With another aspect of the invention, a security device inserts authentication information in a message to another security device. Authentication information may be inserted in every message or into selected messages. Authentication information may assume different forms, including a digital signature or a hash message authentication code (HMAC).

With another aspect of the invention, trust may be refreshed by extracting header information from the message and providing a new device specific non-repeating authenticator to the other security device, determining state information from at least one parameter contained in the header information, and acting on message content only when the state information is valid.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
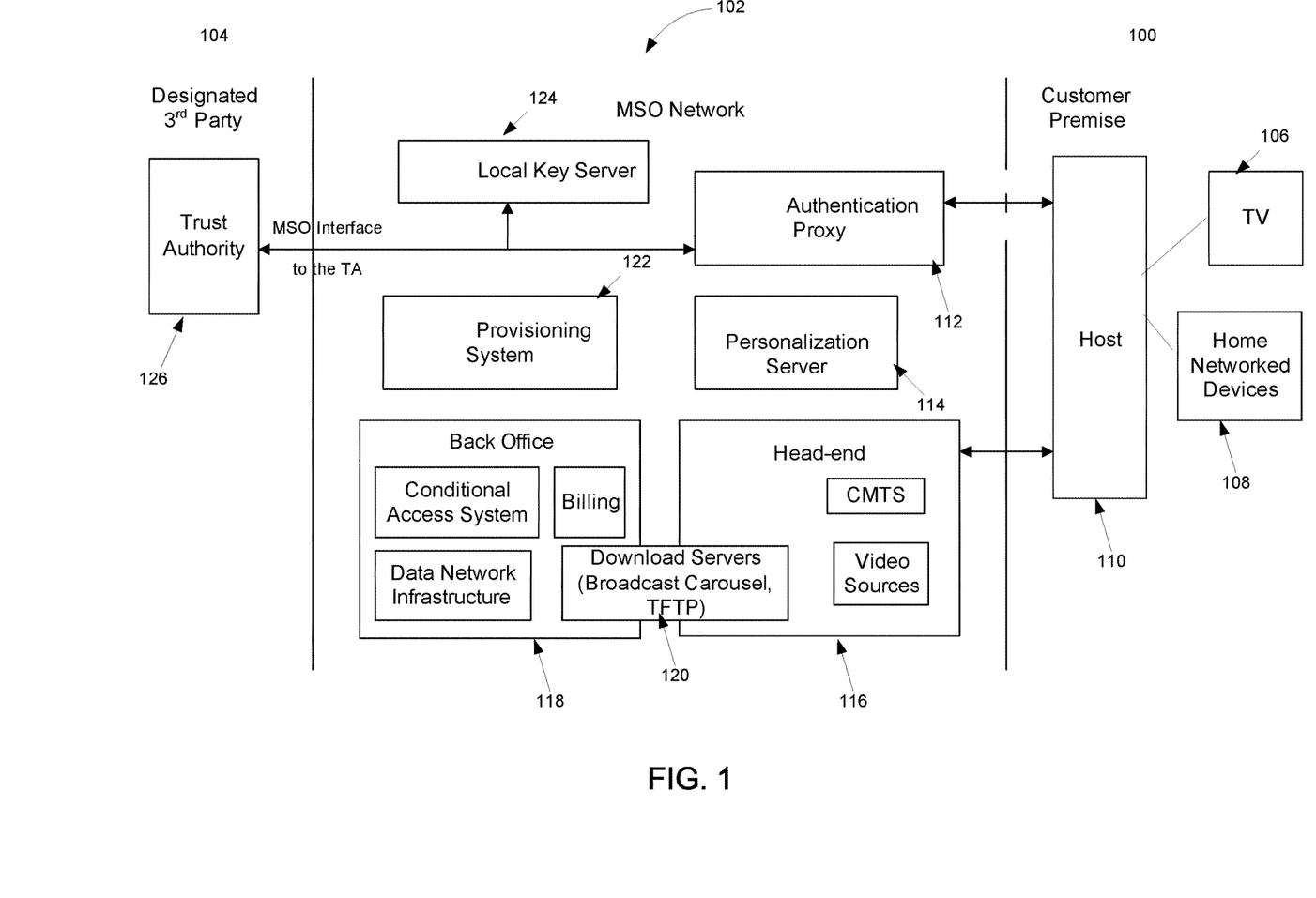
FIG. 1 illustrates a system that may be used to control use of content in a networked environment in accordance with various aspects of the invention.

FIG. 1 illustrates a system that may be used to provide security architecture for protection of advanced video systems and emerging media technologies delivered to compliant premise equipment such as for example a set top box or set top device in accordance with an embodiment of the invention. As used herein "content" includes audio content, video content, and audiovisual content.

In FIG. 1, customer premises 100 may include numerous home network devices 108. The home network devices 108 may include televisions, DVD players, personal computers, home servers, gaming machines, phones, and a host of portable personal media players. Furthermore, customer premises 100 may also include a host device 110 which may in the form of a set top box or set top device.

The host device 110 may communicate to a MSO network 102. The MSO network 102 may include an authentication proxy 112, a personalization server 114, a head-end 116, a back office 118, a provisioning system 122, and a local key server 124. In an embodiment, download servers 120 may interlink the head-end 116 with the back office 118. In an embodiment, the primary point for communication for host 110 is authentication proxy 112. In an additional embodiment, head-end 116 may also directly communicate with host 110 to provide content material.

In another aspect of the invention, FIG. 1 illustrates that a designated third party 104 may provide a trust authority module 126. The trust authority module 126 may provide secure keys and information related to the secure keys to the authentication proxy 112 and/or local key server 124.

Figure 2:
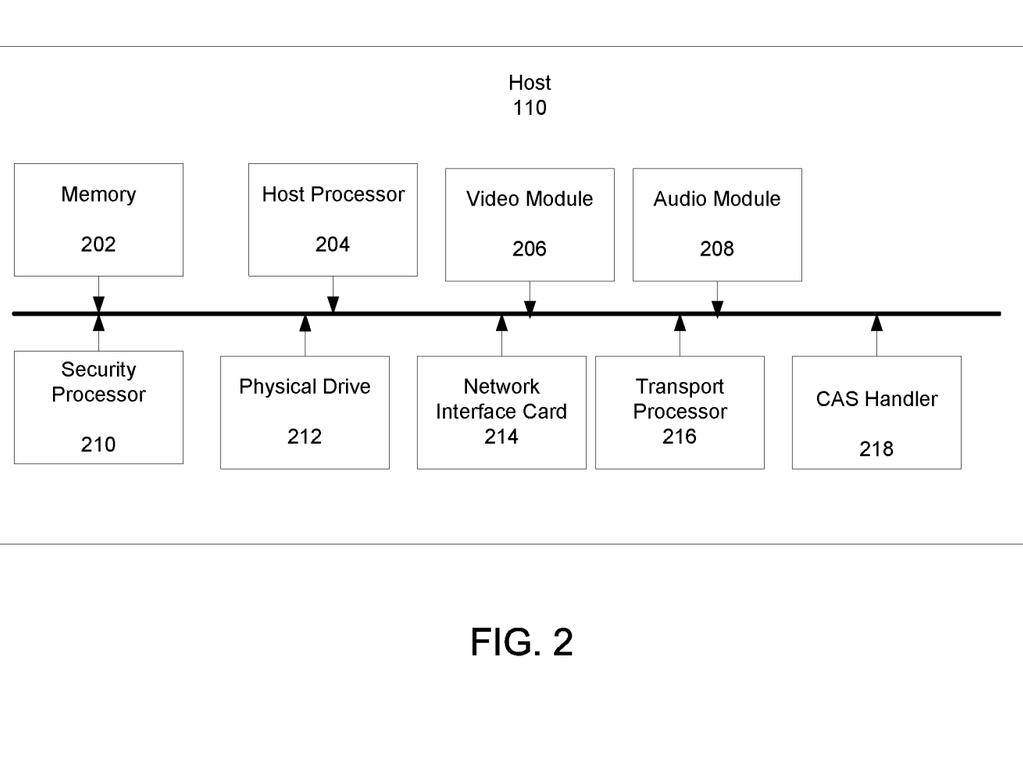
FIG. 2 illustrates an exemplary host device in accordance with various aspects of the invention.

FIG. 2 illustrates an exemplary host device 110 in accordance with an aspect of the invention. In FIG. 2, host device 110 may include memory 202 which may be read-only memory, random access memory, or combination of read-only and random access memory. Furthermore, host device 110 may also include flash memory. Host device 110 may also include a host processor 204 to execute computer-executable instructions which may be stored in memory 202. Similarly, security processor 210 and transport processor 216 may execute computer-executable instructions that may be stored in memory device, e.g., memory 202. Transport processor 216 is used for encryption and decryption of content protected by the authorized service domain or digital rights management. CAS handler 218 may also be included in host device 110. CAS handler 218 may handle message processing according to a specific network configuration. Host processor 204 may handle all routine processing functions for the host device 110. Host device 110 may also include a video module 206 to generate and provide video signals to a display device. An audio module 208 may be used to generate and provide audio signals for playback. In another embodiment, audio module 208 and video module 206 may generate signals to be transmitted to other attached video and or audio devices.

Host device 110 may also include a physical drive 212 to read content stored on physical devices, such as CDs or DVDs. A network interface card 214 may also be included to connect content playback device to a network. The network may be a local area network or a wide-area network, such as the Internet.

In another aspect of the invention, host 110 may include security processor 210. The security processor 210 may be a secure chip that supports various communication protocols. In an embodiment, security processor 210 may generate and store keys for use in creating security packages for transporting content to other content devices attached to a home network.

Figure 3:
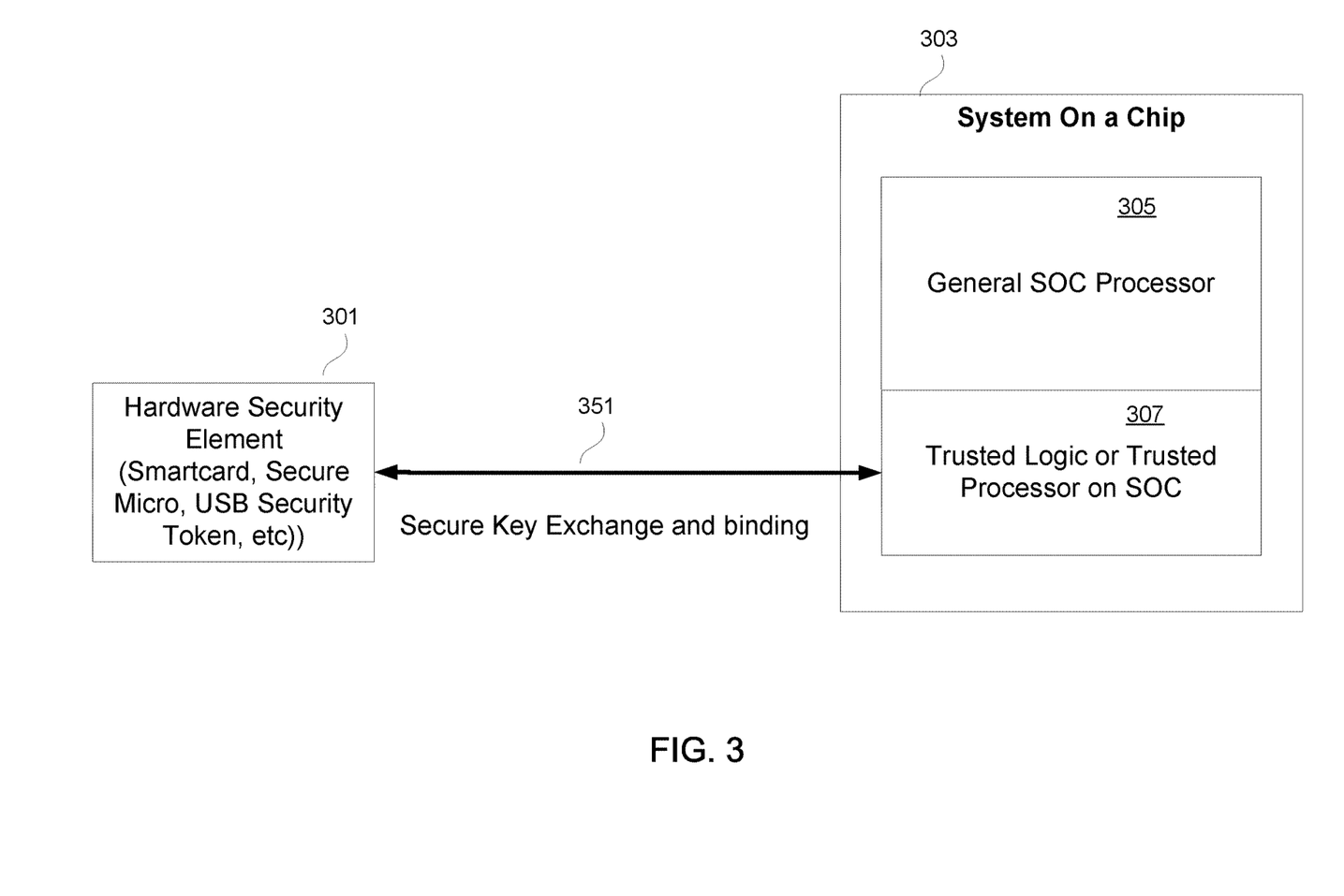
FIG. 3 shows two security devices that bind to establish an initial trust in accordance with various aspects of the invention.

FIG. 3 shows security devices 301 and 303 that bind through communication channel 351 to establish an initial trust by a secure key exchange, in which a communication tunnel is created between devices 301 and 303 in accordance with various aspects of the invention. With some embodiments, each security device may correspond to an integrated circuit ("chip"). With an aspect of the invention, keys may be determined during fabrication of the chips, when apparatus containing the chips is manufactured, or during a network process.

In an illustrative embodiment, authenticated inter-chip communications through communication channel 351 supports a new, more secure, and simplified method with respect to traditional methods by insuring that trust between security devices 301 and 303 is established and maintained. Consequently, specialized keys, control words, digital video recorder (DVR) content encryption keys, content rights data, secret data and system/hardware chip configuration data for encryption content to DVR, decrypting content for viewing and managing content rights, configuration and other keys are delivered in a secure fashion. Typically, video distribution systems into the home utilize an architecture that includes a smaller, low-cost security chip, smart card or universal serial bus (USB) dongle for key management, content rights management, and entitlements.

Figure 5:
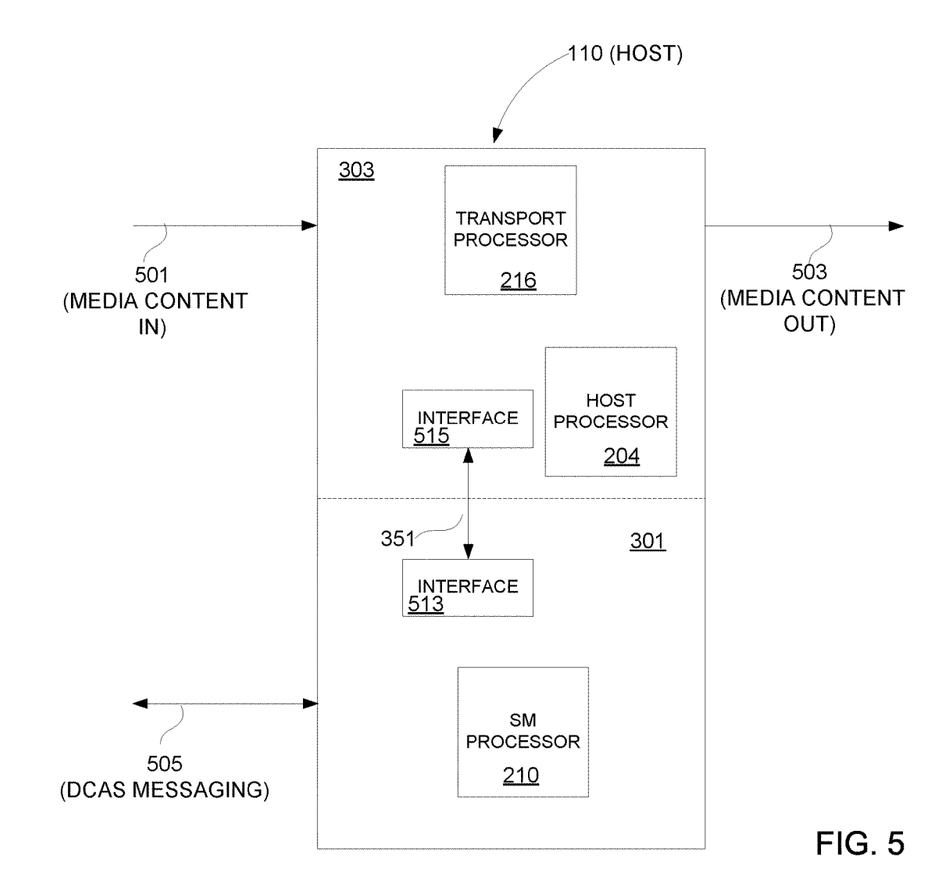
FIG. 5 shows a block diagram of security apparatus at a customer premise in accordance with various aspects of the invention.

Security processor 301 (e.g., smartchip, secure micro, hardware security element) then delivers keys and data through an encrypted interface (e.g., interface 513 as shown in FIG. 5) to a much larger and typically less secure System on a Chip (SoC or SOC) 303. With some embodiments, as exemplified in FIG. 5, host processor 205 may be one component of SoC. Message delivery may typically be completed after a cryptographic binding process where the identity of the SoC 303 is bound to the identity of the security processor 301.

With traditional systems, after the binding, control words and other keys are delivered almost in a blind manner from security processor 301 to SoC 303. There often is no authentication or trust refreshing going on after the initial binding process in traditional systems. This weakness may have vulnerabilities by allowing attacks on the SoC decryption logic if the messages are sent by a hacker tool appearing to be a security processor.

According to aspects of the invention, security information is sent from security processor 301 to SoC 303. However, traditional methods often rely only on the initial pairing of the two identities (SoC 303 and security processor 301) to establish trust. The initial trust may be used from that point for a prolonged period of time (e.g., days, months, or even years) until a new pairing is established that may never occur.

This approach often means that the initial trust may become very stale and it becomes very easy to send messages to SoC 303 that are not from the original security processor 301 to establish behavior and even derive keys with enough sophistication because the SoC will accept all messages.

According to an aspect of the invention, security processor (secure micro) 301 and SoC 303 first establish an initial trust as illustrated in FIG. 3. However, as will be discussed, secure micro 301 and SoC 303 additionally refresh trust between the two security devices through continued communication.

As will be further discussed, SoC 303 may include a trusted processor 307 that is separate from general processor 305, in which trusted processor 307 performs security functions. With some embodiments, general SoC processor 305 may be aligned with the functionality of host processor 204 as shown in FIGS. 2 and 5. Also, with other embodiments, SoC 303 includes special logic to validate (authenticate) messages exchanged between secure micro 301 and SoC 303.

With some embodiments, trust may be established or refreshed by security processor 301 or trusted processor 307 performing authentication based on unique secrets directly validated by a trusted authority (e.g., trust authority 126 as shown in FIG. 1).

Figure 4:
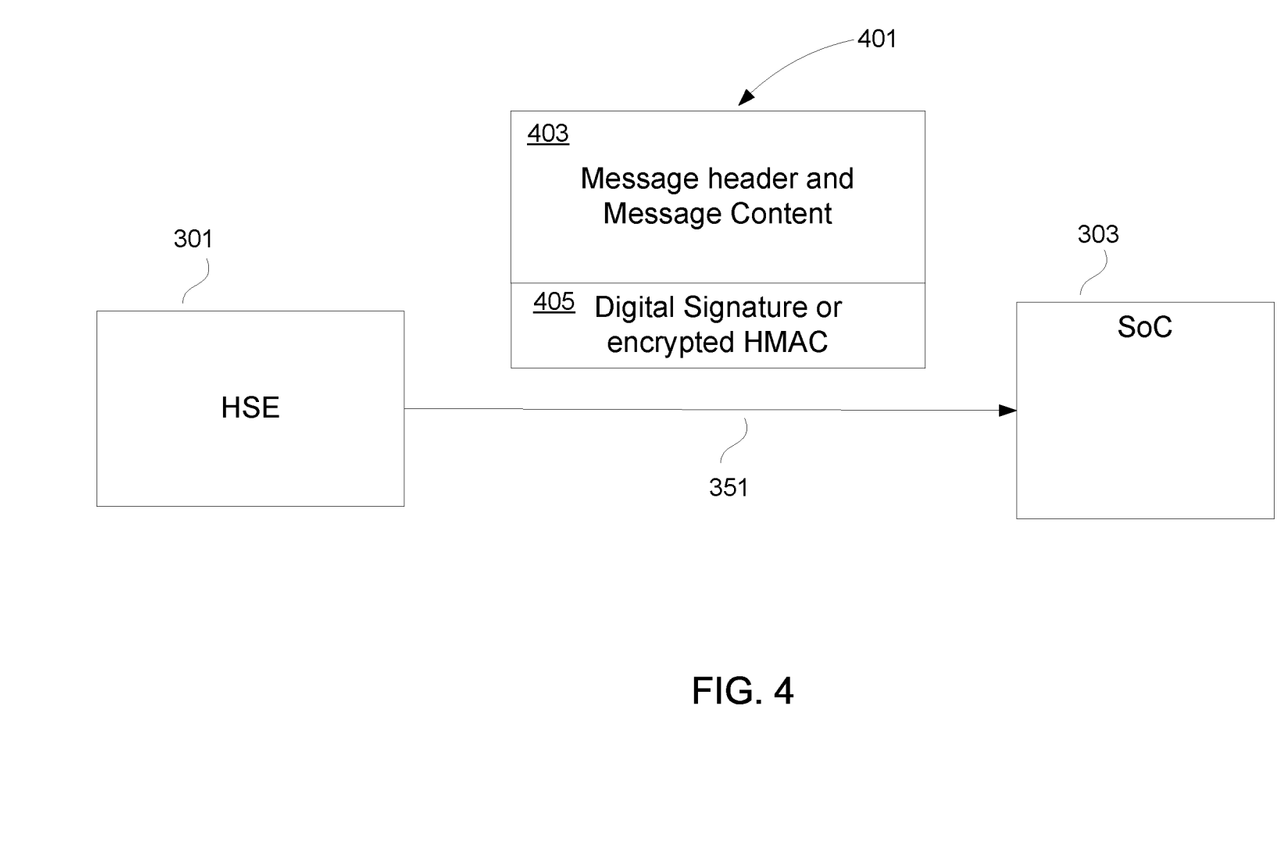
FIG. 4 shows messaging between security devices to refresh trust in accordance with various aspects of the invention.

FIG. 4 shows messaging between security devices 301 and 303 to refresh trust in accordance with various aspects of the invention. Authenticated inter-chip communications supports high security, authenticated communication for all critical messages between the hardware security element 301 (smartcard, secure micro, USB security token, or other security device) and a typically cryptographically weaker SoC 303. Authenticated inter-chip communications allows the secure transfer of keys, content rights, private data, secret configuration data, control words, DVR encryption keys, and other proprietary secret data from hardware security element 301 to SoC 303 by using either asymmetric digital signatures or a symmetric key based hash message authentication code (HMAC) with a strong one way hash function, e.g., SHA-1 or SHA-256.

Message 401 with encrypted keys, control words, content rights, secret data may be sent in messages that are either digitally signed or sent with an appended HMAC 405 such that trusted processor core 307 on the SoC 303 (or special signature/HMAC validation logic) receives message 401 and validates the authenticity by calculating the digital signature or HMAC and comparing the results to the signature or HMAC sent in the message. If the message is validated, trusted processor 307 or other hardware logic extracts the encrypted elements 403 of each message 401 and places these pieces into the correct logic buffers/registers for decryption.

If message 401 is invalid (i.e., cannot be correctly authenticated), element 403 may not be extracted and inserted into the first security device's logic for decryption. However, an error message may be returned to the message source indicating that the message is invalid. With other embodiments, a response is not required to be sent and the valid or invalid message status may be set in registers that the message source could poll. This process assumes that the first security device (e.g., SoC 303) contains a public key for signature validation that is paired to a private signing key stored in the second security device (e.g., hardware security element 301) for asymmetric signature validation.

With asymmetric keys, a first security device may use the second security device's public key to send an encrypted message to the second security device. In the message, the first security device may claim to be the first security device. However, with traditional systems the second security device has no way of verifying that the message was actually from the first security device since anyone can use second security device's public key to send encrypted messages. In order to verify the origin of a message, the first security device may use a public-key cryptographical algorithm, e.g., the Rivest, Shamir, and Adleman (RSA) algorithm, to sign a message or create an HMAC using a message authenticator hash function such as SHA-1. The first security device not only uses the encryption and signing or hash functions but also includes a device specific non-repeating value as an authenticator that can only be interpreted by the second device as having come from a device within the trusted system. This device specific non-repeating authenticator is selected by the Trusted Authority and provided to the first security device in a manner than can only be used by that specific second security device (e.g. encrypted so that only the second security device can decrypt). The non-repeating authenticator is passed from the first security device to that specific second security device as part of the embodiments of communication. Then the second security device provides the first security device specific non-repeating authenticator to the first security device to complete the binding. With embodiments, the first security device can sign selected messages or all messages to be trusted by the second security device and vice versa.

Using the RSA algorithm, in order to send a signed message, the first security device uses the first security device's own private key. The first security device may produce a hash value of the message, raises it to the power of d mod n (where d is the private key exponent and n is the modulus), and attaches it as a signature to the message. When the second security device receives the signed message, the second security device may use the same hash algorithm in conjunction with the first security device's public key. For example, a SHA-1 hash is calculated by the sender and then encrypted with the sender's private key. The receiver subsequently decrypts the hash value with the public RSA key, calculates the message hash, and compares the calculated hash value to the decrypted hash value (message digest). If the two agree, the second security device knows that the author of the message was in possession of the first security device's secret key and that the message has not been tampered with.

In an illustrative embodiment, HMAC may be used to authenticate messages. For example, both HSE 301 and the SOC 303 may have a pre-shared symmetric key for generating and validating the HMAC on the message. With some embodiments, HSE 301 may comprise a security processor. SoC 303 may include trusted processor 307 that is separate from general processor 305 and is used for security functions. Alternatively, SoC 303 contains special logic to validate the signature or HMAC. With this method implemented in SoC 303, the hacker typically does not have the ability to send numerous messaging into the SoC 303 in an attempt to characterize the security logic or extract the keys inside the SoC 303.

With embodiments using HMAC, a symmetric key may be used to authenticate messages between security devices. For example, a hash message authentication code may be determined and inserted in message 401 from the first security device to the second security device. The first security device typically uses a specific algorithm involving a cryptographic hash function in combination with a secret key. In order to determine an HMAC value (digest), different cryptographic hash function, e.g., MD5, SHA-1, or SHA-256, may be used in the calculation of the HMAC. The corresponding MAC algorithm is termed HMAC-MD5, HMAC-SHA-1, or HMAC-SHA-256, respectively. The cryptographic strength of the HMAC depends upon the cryptographic strength of the underlying hash function, the size and quality of the key, and the size of the hash output length in bits.

The HMAC value is typically defined as:

$$HMAC_K(m)=h((K \text{ XOR opad})\|h((K \text{ XOR ipad})\|m))$$

where h is a cryptographic hash function, K is a secret key padded to the right with extra zeros to the block size of the hash function, m is the message to be authenticated, ∥ denotes concatenation, XOR denotes exclusive or, and the outer padding opad=0x5c5c5c . . . 5c5c and inner padding ipad=0x363636 . . . 3636 are two one-block-long hexadecimal constants.

As an example, the first security device may deposit its secret key with the second security device. Alternatively, the delivery of the HMAC secret key may be performed in advance by provisioning or at fabrication time for the device. Along with a message from the first security device, the first security device provides the message's HMAC digest, computed using the first secure device's symmetric key. The second security device, knowing the customer's symmetric key, can then verify that the message originated from the first security device and has not been tampered with. With some embodiments, the message digest or hash value is computed using SHA-1 or SHA-2, and then encrypted with the sender's secret HMAC key. The receiver then decrypts the HMAC to obtain the message digest and uses it to compare to a message digest calculated by the receiver of the message.

FIG. 5 shows a block diagram of security apparatus at a customer premise in accordance with various aspects of the invention. With some embodiments, SoC 303 includes various components including transport processor 216.

Transport processor 216 performs cryptographic services such as decryption of content input media content 501 based on key information from secure micro 301. Consequently, output media content 503 may be provided to playback devices 106 and 108. Transport processor 216 may be used for encryption and decryption of content protected by the authorized service domain or digital rights management. Transport processor 216 may use secure information received from secure micro 301 in accordance with messaging 505 from MSO 102.

In an illustrative embodiment, SoC 303 obtains specialized keys, control words, digital video recorder (DVR) content encryption keys, content rights data, secret data and system/hardware chip configuration data for encryption content to DVR, decrypting content for viewing and managing content rights, configuration and other keys from secure micro 301 via messaging over communication channel 351 through interfaces 513 and 515. Using the received security information, transport processor 216 may be able to decrypt input media content 501.

In another illustrative embodiment, security processor 210 provides services to perform the DCAS protocol, generate and store keys, secrets and related information, and store SM Client data and client code. Host processor 204 handles all processing functions for the DCAS host except those defined for transport processor 218 and secure processor 210.

With an aspect of the invention, secure micro 301 and SoC 303 support different message types in accordance with the Table "HEADER INFORMATION FOR INTER-CHIP COMMUNICATION." Exemplary message types that are supported between secure micro 301 and SoC 303 may include: ChannelChangeEvent, InstallTPData, InitializationSecurityPackage, CWSecurityPackage, and ASDSecurityPackage. The ChannelChangeEvent DLDU indicates that a channel change has occurred on an Inband Connection Identifier, where DLCU is the acronym for DCAS Layer Data Unit. Secure micro 303 may use the InstallTPData DLDU to provision the control word tunnel key and the security package authentication key with transport processor 216. The InitializationSecurityPackage DLDU from secure micro 301 specifies the CA System ID and optionally the Initialization Vector associated with the specified algorithm. The InitializationSecurityPackage DLDU is sent to transport processor after the InstallTPData Security Package. Secure micro 301 (CAS Client) uses the CWSecurityPackage DLDU to change the current value of the even or odd control word that transport processor 216 is using to decrypt content for a particular connection. The ASDSecurityPackageDLDU is sent by secure micro 301 (ASD Client) to transport processor 218 to update the currently active encryption or decryption key and to deliver authenticated information to the ASD host. While some embodiments may utilize an Inband architecture to describe the use, embodiments may support out-of-band or other physical media messaging.

TABLE

HEADER INFORMATION FOR INTER-CHIP COMMUNICATION

| Message Type | Header Information |
| --- | --- |
| ChannelChangeEvent | DLDU Type 0x2f |
| | Producer Id 0x09 |
| | Consumer Id 0x08 |
| | Counter Included Flag 0x0 |
| | Connection Id, The value of the Connection ID that had a channel change event. |
| InstallTPData | DLDU Type 0x11 |
| | Producer Id 0x00 |
| | Consumer Id 0x09 |
| | Counter Included Flag 0x1 |
| | DLDU Counter, The value of the counter assigned by the Producer. |
| | Processing Rule Id 0x00 |
| InitializationSecurityPackage | DLDU Type 0x52 |
| | Producer Id 0x01 |
| | Consumer Id 0x09 |
| | Counter Included Flag 0x1 |
| | DLDU Counter, The value of the counter assigned by the Producer. |
| | Processing Rule Id 0x00 |
| CWSecurityPackage | DLDU Type 0x51 |
| | Producer Id 0x01 |
| | Consumer Id 0x09 |
| | Counter Included Flag 0x0 |
| | Connection Id identifies the Inband connection to which this security package relates |
| | Processing Rule Id 0x00 |
| ASDSecurityPackage | DLDU Type 0x53 |
| | Producer Id 0x02 |
| | Consumer Id 0x09 |
| | Counter Included Flag 0x0 |
| | Connection Id identifies the Inband or DVR connection to which this security package relates |
| | Processing Rule Id 0x00 |

Figure 6:
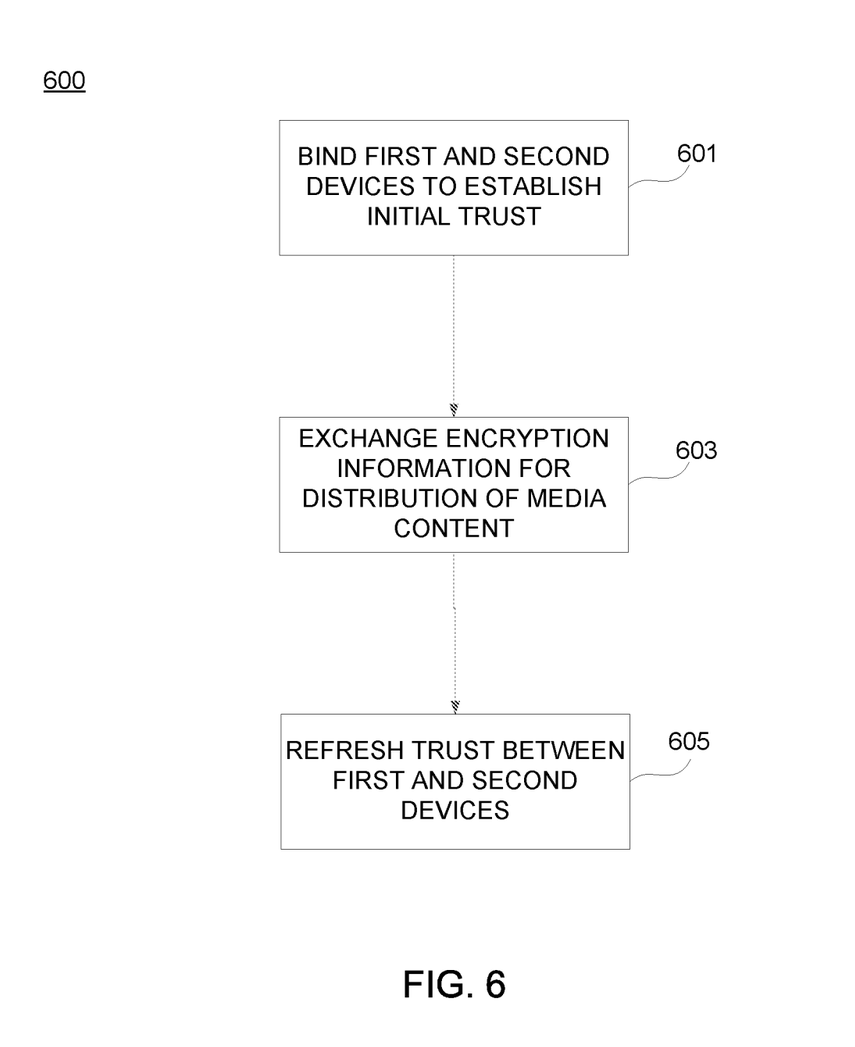
FIG. 6 shows a flow diagram for establishing and maintaining trust between security devices in accordance with various aspects of the invention.

FIG. 6 shows flow diagram 600 for establishing and maintaining trust between secure micro 301 and SoC 303 in accordance with various aspects of the invention. In step 601, a cryptographic binding process is performed, where the identity of the SoC 303 is bound to the identity of the secure micro 301. The devices may exchange secure keys and create a secure inter-chip communications tunnel. Subsequently, secure micro 301 and SoC 303 exchange encryption information through an encrypted interface (e.g., interface 513 as shown in FIG. 5) to SoC 303 in step 603. However, as discussed previously, the initial binding process may become stale, allowing attacks on the SoC decryption logic if the messages are sent by a hacker tool appearing to be a secure micro 301. In addition, attacks on secure micro 301 may occur where a hacker pretends to be the binded SoC.

Consequently, trust may be refreshed between secure micro 301 and SoC 303 in step 605. In an illustrative embodiment, trust may be refreshed by authenticating every message that is exchanged between secure micro 301 and SoC 303 so that step 603 and step 605 are merged as one process. However, other illustrative embodiments may refresh trust by authenticating selected messages or by periodically refreshing trust based on a predetermined time period.

With embodiments of the invention, security element 301 may request key information from trust authority 126 through authentication proxy 112. In response, authentication proxy 112 processes a key response message to provide security element 301 a set of keys that that been forwarded from trust authority 126.

Figure 7:
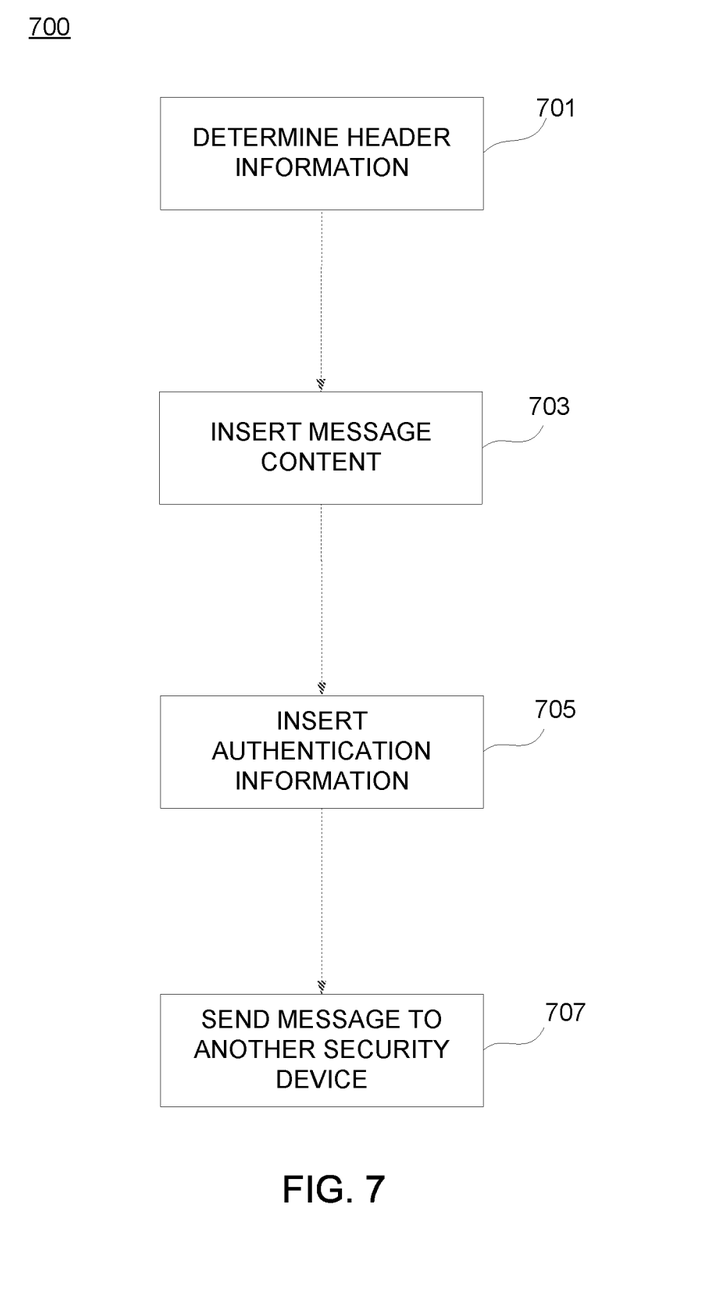
FIG. 7 shows a flow diagram for sending messages from a first security device to a second security device in accordance with various aspects of the invention.

FIG. 7 shows flow diagram 700 for sending messages from a first security device to a second security device in accordance with various aspects of the invention. The first security device and the second security device may correspond to secure micro 301 and SoC 303, respectively or vice versa. Steps 701-707 support refreshing trust between the first and second security devices corresponding to step 605 as shown in FIG. 6.

In step 701, header information may be determined in accordance with the message type (e.g., as shown in the above Table), and is inserted with the message content (corresponding to message part 403 as shown in FIG. 4) in step 703. In step 705 authentication information 405 (e.g., the HMAC or digital signature) may be included with message 401. Message 401 may then be sent from the first security device to the second security device over communication channel 351 through interfaces 513 and 515.

Figure 8:
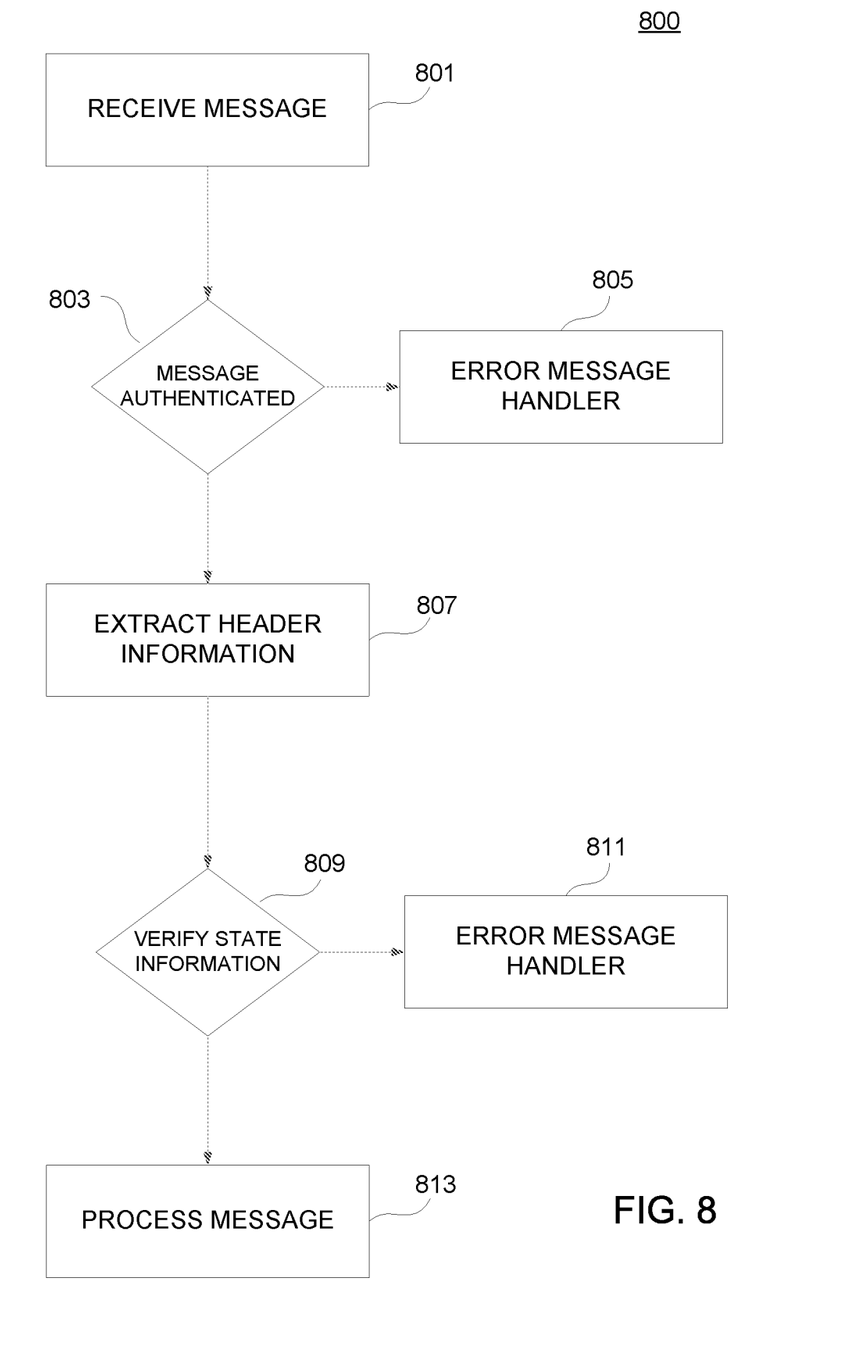
FIG. 8 shows a flow diagram for receiving messages at a first security device from a second security device in accordance with various aspects of the invention.

FIG. 8 shows flow diagram 800 for receiving messages at a first security device from a second security device in accordance with various aspects of the invention. In an illustrative embodiment, steps 801-813 support refreshing trust between the first and second security devices in accordance with step 605.

In step 801, a message may be received at the first security device from the second security device. (Embodiments of the invention also support the second security device receiving a message, e.g., message 401, from the first security device.) The received message is authenticated in step 803 to verify that the received message was indeed sent by the second security device and not by a rogue device (i.e., hacker). If the authentication information is incorrect (e.g., the calculated HMAC does not match the received HMAC or the digital signature is invalid), message content is not extracted and further processed by the first security device. Rather, error handling of the messaging is initiated by step 805. With an embodiment, step 805 generates an error message, which is sent to the message source. Errors may be reported so that hacking tendencies can be reviewed as required. With other embodiments, the message is ignored and is recorded in a register of the first security device in step 805.

If the message is successfully authenticated, header information from the received message is extracted in step 807. Step 809 processes the header information to verify that the determined state information is valid. State information may be determined from parameters contained in the message header. According to an embodiment and as illustrated in the Table, the message header includes various parameters including the Producer Id, Consumer Id, Counter Included Flag, DLDU counter, and Processing Rule Id. For example, Producer Id identifies the messaging entity that produced the message, and Consumer Id identifies the messaging entity to consume the message. Connection Id identifies the associated in-band connection.

State information may be determined from one or more parameters in the message header, e.g., Counter Included Flag and Processing Rule Id. In combination or separately from the header information, state information may be determined from the sequencing of the messages. For example, the InitializationSecurityPackage DLDU is sent to transport processor after the InstallTPDataSecurityPackage. However, if the InstallTPDataSecurityPackage is sent before the InitializationSecurityPackage, then SoC 303 could determine that the source of the message is really not secure micro 301. In addition, duplicate messaging is indicative of improper state sequencing. With another exemplary embodiment, SoC 303 must receive InstallTPData and then InitializationSecurityPackage in this order before receiving Control Word SecurityPackage. The Processing Rule ID is used to identify rules previously set by the security device in other communication with the SOC. Within the header of these message types, it identifies which preset rule and sequence of state information to use when processing the message and additionally provides controls on which messages that can be received by the various elements of the SoC 303.

In an illustrative embodiment, if the first security device determines that the state information is valid, then the first security device extracts the message content and processes it in step 813. Otherwise, error handling of the message is initiated in step 811 as previously discussed with step 805.

While the exemplary embodiments have been discussed in broad terms of a cable communications networking environment, the invention, however, may be configured for other networking environments including telecommunications environments.

We claim:

1. A method comprising:
   establishing, over a communication channel, an initial trust between a first computing device and a second computing device; and
   refreshing the initial trust by performing at least the following:
   receiving, by the first computing device and from a trusted authority, a first non-repeating authenticator that is unique to the first computing device and configured to be validated by the second computing device;
   signing, by the first computing device and using a first key associated with the first computing device, a first message, wherein the first message comprises the first non-repeating authenticator and a first header parameter;
   sending, by the first computing device and to the second computing device, the signed first message;
   receiving, by the first computing device and from the second computing device, a signed second message, wherein the signed second message comprises a second non-repeating authenticator that is unique to the second computing device and configured to be validated by the first computing device; and validating, by the first computing device, the signed second message, wherein the validating is based on:
   validating the second non-repeating authenticator, and
   using a second key associated with the second computing device.

2. The method of claim 1, further comprising:
acting on message content of the signed second message after the validating of the signed second message.

3. The method of claim 2, further comprising:
extracting header information from the signed second message; and
determining the first header parameter based on a sequence rule for the first message and for subsequent messages between the first computing device and the second computing device, the first header parameter comprising a first order sequence rule.

4. The method of claim 3, further comprising:
determining a message type for the signed second message based on the first order sequence rule; and
determining whether the signed second message is a same message type as the first message based on the message type.

5. The method of claim 2, wherein
the first header parameter comprises a first order sequence rule for the first message and for subsequent messages between the first computing device and the second computing device,
the first message further comprises a second header parameter, the second header parameter comprising a message order sequence rule for the first message and for the subsequent messages between the first computing device and the second computing device, and
the validating of the signed second message is also based on the first order sequence rule and on the message order sequence rule.

6. The method of claim 5, wherein the first order sequence rule comprises a counter and the message order sequence rule comprises an order of header information for subsequent messages.

7. The method of claim 1, wherein the first message is encrypted, for decryption by the second computing device, using the first key.

8. The method of claim 1, wherein the first key comprises a private key associated with the first computing device, and the second key comprises a public key corresponding to a private key associated with the second computing device.

9. The method of claim 1, wherein the first non-repeating authenticator is encrypted and configured to be decrypted by the second computing device.

10. A system comprising:
a first computing device; and
a second computing device,
wherein the first computing device comprises:
   at least one processor; and
   non-transitory memory storing computer-readable instructions that, when executed by the at least one processor, cause the first computing device to:
      establish, over a communication channel, an initial trust with the second computing device; and
      refresh the initial trust by performing at least the following:
         receiving, from a trusted authority, a first non-repeating authenticator that is unique to the first computing device and configured to be validated by the second computing device;
         signing a first message using a first key, wherein the first message comprises the first non-repeating authenticator and a first header parameter;
         sending the signed first message to the second computing device;
         receiving, from the second computing device, a signed second message, wherein the signed second message comprises a second non-repeating authenticator that is unique to the second computing device and configured to be validated by the first computing device; and
         validating the signed second message based on:
            validating the second non-repeating authenticator, and
            using a second key associated with the second computing device.

11. The system of claim 10, the memory further storing computer-readable instructions that, when executed by the at least one processor, cause the first computing device to:
act on message content of the signed second message after the validating of the signed second message.

12. The system of claim 10, the memory further storing computer-readable instructions that, when executed by the at least one processor, cause the first computing device to:
extract header information from the signed second message; and
determine the first header parameter based on a sequence rule for the first message and for subsequent messages between the first computing device and the second computing device, the first header parameter comprising a first order sequence rule.

13. The system of claim 10, wherein the first non-repeating authenticator is encrypted and configured to be decrypted by the second computing device.

14. The system of claim 10, wherein the first key comprises a private key associated with the first computing device, and the second key comprises a public key corresponding to a private key associated with the second computing device.

15. The system of claim 10, wherein the first message is encrypted, for decryption by the second computing device, using the first key.

16. The system of claim 12, the memory further storing computer-readable instructions that, when executed by the at least one processor, cause the first computing device to:
determine a message type for the signed second message based on the first order sequence rule; and
determine whether the signed second message is a same message type as the first message based on the message type.

17. The system of claim 10, wherein
the first header parameter comprises a first order sequence rule for the first message and for subsequent messages between the first computing device and the second computing device,
the first message further comprises a second header parameter, the second header parameter comprising a message order sequence rule for the first message and for the subsequent messages between the first computing device and the second computing device, and
the validating of the signed second message is also based on the first order sequence rule and on the message order sequence rule.

18. An apparatus comprising:
at least one processor; and
non-transitory memory storing computer-readable instructions that, when executed by the at least one processor, cause the apparatus to:
  establish, over a communication channel, an initial trust with a computing device;
  refresh the initial trust by performing the following:
    receiving, from a trusted authority, a first non-repeating authenticator that is unique to the apparatus and configured to be validated by the computing device;
    signing a first message using a first key, where the first message comprises the first non-repeating authenticator and a first header parameter;
    sending the signed first message to the computing device;
      receiving, from the computing device, a signed second message, wherein the signed second message comprises a second non-repeating authenticator that is unique to the computing device and configured to be validated by the apparatus; and
    validating the signed second message based on:
      validating the second non-repeating authenticator, and
      using a second key associated with the computing device.

19. The apparatus of claim 18, the memory further storing computer-readable instructions that, when executed by the at least one processor, cause the apparatus to:
  act on message content of the signed second message after the validating of the signed second message.

20. The apparatus of claim 18, the memory further storing computer-readable instructions that, when executed by the at least one processor, cause the apparatus to:
  extract header information from the signed second message; and
  determine the first header parameter based on a sequence rule for the first message and for subsequent messages between the apparatus and the computing device, the first header parameter comprising a first order sequence rule.

21. The apparatus of claim 18, wherein the first non-repeating authenticator is encrypted and configured to be decrypted by the computing device.

22. The apparatus of claim 20, the memory further storing computer-readable instructions that, when executed by the at least one processor, cause the apparatus to:
  determine a message type for the signed second message based on the first order sequence rule; and
  determine whether the signed second message is a same message type as the first message based on the message type.

23. The apparatus of claim 18, wherein
the first header parameter comprises a first order sequence rule for the first message and for subsequent messages between the apparatus and the computing device,
the first message further comprises a second header parameter, the second header parameter comprising a message order sequence rule for the first message and for the subsequent messages between the apparatus and the computing device, and
the validating of the signed second message is also based on the first order sequence rule and on the message order sequence rule.

* * * * *

UNITED STATES PATENT AND TRADEMARK OFFICE
CERTIFICATE OF CORRECTION

PATENT NO. : 10,003,604 B2
APPLICATION NO. : 15/008060
DATED : June 19, 2018
INVENTOR(S) : Fahrny et al.

It is certified that error appears in the above-identified patent and that said Letters Patent is hereby corrected as shown below:

On the Title Page

Column 1, (*) Notice, Line 3:
Please delete "days. days." and insert --days.--

In the Drawings

Sheet 3 of 8, Fig. 3, Reference Numeral 301, Line 5:
Delete "etc))" and insert --etc.)--

In the Specification

Column 4, Detailed Description, Line 44:
Delete "205" and insert --204--

Column 6, Detailed Description, Line 67:
Delete "HMAC-MDS," and insert --HMAC-MD5,--

Column 7, Detailed Description, Line 61:
Delete "218" and insert --216--

Column 7, Detailed Description, Line 61:
Delete "secure" and insert --security--

Column 8, Detailed Description, Line 5:
Delete "Identifier, where DLCU" and insert --Identifier, where DLDU--

Column 8, Detailed Description, Line 6:
Delete "303" and insert --301--

Signed and Sealed this
Eighth Day of January, 2019

Andrei Iancu
*Director of the United States Patent and Trademark Office*

CERTIFICATE OF CORRECTION (continued)
U.S. Pat. No. 10,003,604 B2

Column 8, Detailed Description, Line 13:
Delete "InstallPData" and insert --InstallTPData--

Column 8, Detailed Description, Line 17:
Delete "ASDSecurityPackageDLDU" and insert --ASDSecurityPackage DLDU--

Column 8, Detailed Description, Line 19:
Delete "218" and insert --216--

Column 10, Detailed Description, Lines 27-28:
Delete "Control Word" and insert --ControlWord--